Aug. 15, 1961  E. L. MERRITT  2,995,992
ZENITH CAMERA SYSTEM
Filed July 29, 1958  4 Sheets-Sheet 1

INVENTOR
EVERETT L. MERRITT

BY Walter S. Paul
ATTORNEY

INVENTOR
EVERETT L. MERRITT
BY Walter S. Pawl.
ATTORNEY

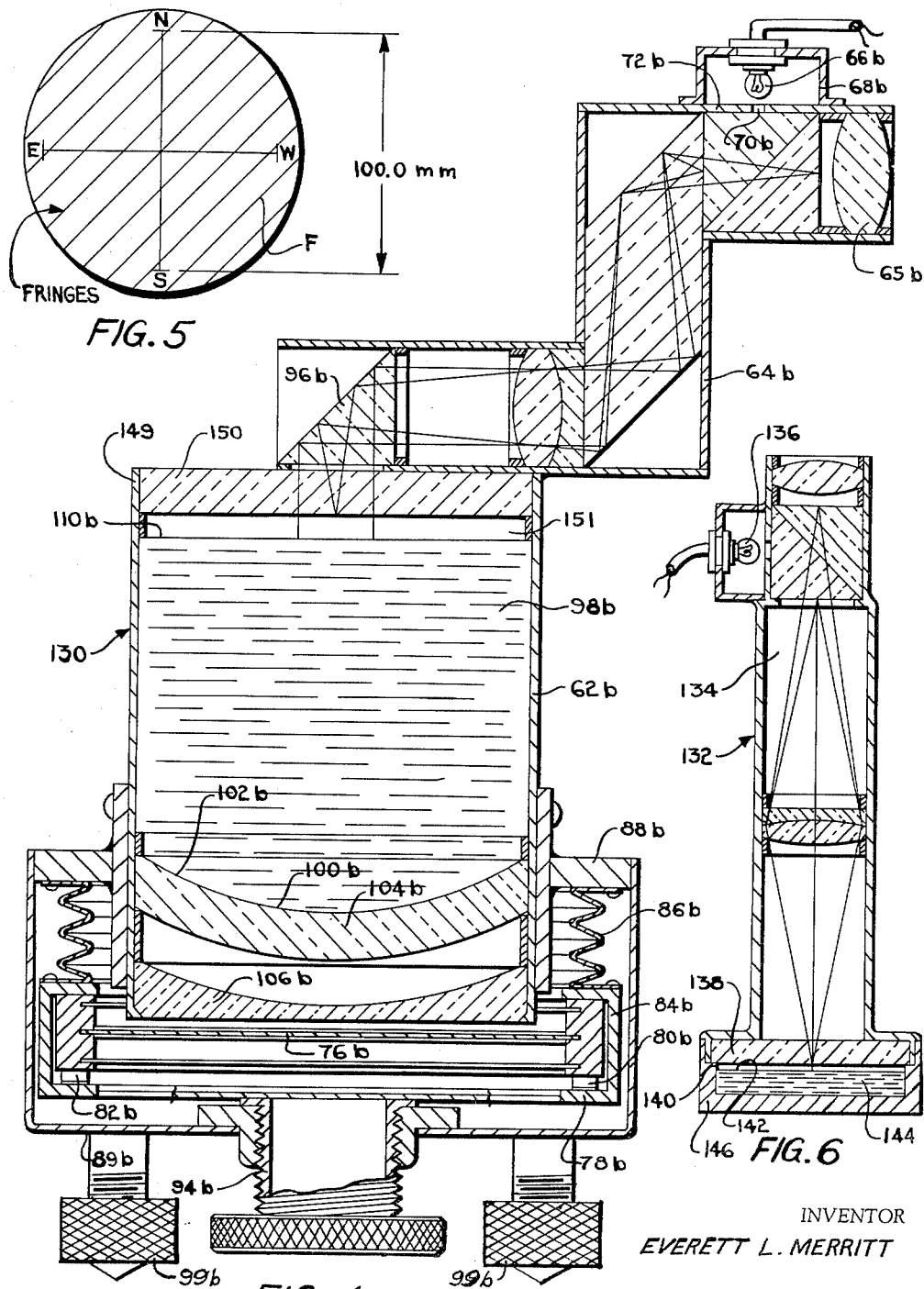

United States Patent Office 2,995,992
Patented Aug. 15, 1961

2,995,992
ZENITH CAMERA SYSTEM
Everett L. Merritt, Falls Church, Va., assignor to Photogrammetry, Inc., Silver Spring, Md., a corporation of Delaware
Filed July 29, 1958, Ser. No. 751,771
8 Claims. (Cl. 95—11)

This invention relates to cameras and particularly to zenith camera systems and cameras whose accuracy and complexity varies in accordance with local requirements.

To exemplify the principles of the invention several zenith cameras are illustrated and described. The first is a self-levelling zenith camera requiring a single exposure, simplified data reduction and a position accuracy of twenty seconds. This system is intended for reconnaissance. A second design is based on manual autocollimation and is intended to yield an accuracy of one arc second. The third camera system is embodied in a design based on levelling through the use of interference fringes and has for a design achievement accuracy to one-fifth arc second. The latter is an instrument for earth configuration studies and Laplace equation data.

In order to obtain a better understanding of the problems solved by our invention and the place in the art which the invention occupies, it is necessary to consider some current equipment and technical information surrounding the invention and current equipment. Accordingly, considering the definition of the vertical, it is the normal to an equipotential surface or the apparent resultant direction of gravity. The astronomic coordinates of an exposure station are the direction angles of the vertical referred to the equator and the Greenwich meridian. The gravitational vertical differs from the normal to an ellipsoid of revolution. The ellipsoid of revolution is a mathematical configuration that corresponds to a homogeneous earth with a constant elevation. The earth is not homogeneous and has an undulating equipotential surface rising above the mathematical configuration in highland masses and falling below the mathematical configuration over the oceans. Thus aside from the fact that the normal to one level surface is not normal to another level surface above or below a given point, the maximum and minimum points of the geoidal surface are more or less parallel to the ellipsoid of revolution. The greatest differences between the mathematical normal and the geoidal normal occurs at the deflection points and are the changes in the geoidal surface from high to low. The undulating character of the geoidal surface is explained in terms of the theory of isostasy. According to the theory of isostasy there is an equipotential surface at some depth referred to as the isostatic compensation. This surface more nearly approximates one that may be defined mathematically. The depth of isostatic compensation is based on the assumption that unit surface areas have unit masses regardless of height down to a depth of sixty or seventy kilometers. Therefore it is assumed that the deviation of the plumb is due to variations in density of the material in the immediate vicinity of the exposure station. The various surfaces are easily visualized, and the deviation from the plumb is on an average of plus or minus two arc seconds over the world with a few isolated examples exceeding plus or minus one arc minute.

Insofar as the application of astronomic data is concerned, one can easily draw an erroneous conclusion that astronomic data, being subject to deviation of the plumb, is inaccurate and useless. In many cases the astronomic coordinates of the direction of gravity are determined with greater accuracy than the geoidic coordinates of the normal to the ellipsoid. Astronomic coordinates have the following basic uses:

(1) Astronomic coordinates may be employed in remote areas where no geoidic control exists.

(2) Astronomic coordinates are required for Laplace equation data employed in the adjustment of triangulation nets.

(3) The true shape of the geoid is no better than the number and accuracy of the observed astronomic coordinates.

(4) Other types of physical measurements such as those relative to terrestrial magnetism and gravity must be supplemented with astronomic coordinates at the observation station.

The Air Force zenith camera is used as a typical example of current equipment. This zenith camera consists of a fixed focus lens-cone assembly and a vertical spindle equipped with two horizontal level vials mounted normal to each other. The whole assembly is supported on three foot screws. The camera is oriented on the vertical in the usual manner of alternately adjusting level vials and working the foot screws until the bubbles remain centered in an azimuthal rotation of 360° about the vertical. The mechanical axis then defines the vertical within the accuracy of the bubbles and spindle, and the optical axis of the camera either defines the vertical or generates a cone with equal zenith angles whose axis is the mechanical axis. The mean astronomic coordinates of two exposures 180° apart are the astronomic coordinates of the mechanical axis. The geometry of the conventional arrangement is quite well known.

The most expensive part of this instrument and the most subject to damage and malfunction is the vertical spindle. Removal of the vertical spindle removes a source of error, a possible malfunction in the field, and reduces the manufacturing costs.

This invention contemplates the omission of that spindle. Assume fixed bubbles are mounted on the camera and that the spindle serves only as a convenient means of azimuth rotation. Let the bubbles be centered by working the foot screws and an exposure be made. Then rotate the camera 180° about the vertical, recenter the bubbles and make a second exposure. It is evident that the optical axis again generates a fixed cone whose axis is the normal to the equipotential surface defined by the centered bubbles. The accuracy of the generated cone's symmetry is only dependent on the reproducibility of the bubbles and is independent of the spindle accuracy. Some experience with this technique demonstrates that an operator can center the bubbles with each exposure easier than he can adjust the bubbles and hope they will remain centered for the time of two exposures. A position accuracy of five arc seconds with a four inch focal length using the fixed bubble technique suggest that greater accuracy may be obtained with the zenith camera of the Air Force if it were used as a fixed bubble camera, and the invention exploits this theory.

The present method of data reduction of zenith camera exposures is referred to as the method of dependencies. The method of dependencies is one of iteration and assumes the interior orientation data to be correct. Data reduction suggested embraces calibration of the exposure as a preliminary to astronomic position with a three star image solution or a simultaneous determination of interior orientation and astronomic coordinates with a four star image solution. The theory behind calibrating such exposure is that it is physically impossible to repeat the plate orientation and plate image distance corresponding to laboratory derived interior orientation data. Therefore, there is a particular interior orientation for each exposure that if known, will improve the accuracy of the reduced astronomic coordinates.

The accuracy of astronomic positions obtained with prismatic astrolabes suggests that still greater accuracy may be obtained without reversal by a method of vertical autocollimation. The method, again, can be practiced by revising the Air Force zenith camera and using some auxiliary equipment including an autocollimating eyepiece mounted on the objective end of the Air Force zenith camera and that is adjustable axially and laterally.

The foregoing shows the modification in technique and one existing, currently used zenith camera. The purpose of this invention, apart from providing new zenith camera designs, is to lead to a more accurate determination of the astronomic coordinates of a camera station by photogrammetric means and a more expeditious determination of the astronomic coordinates of a camera station for those situations where the highest accuracy is not paramount or trained operators are not available. By revising the current zenith camera discussed above, it can be shown that the existing zenith cameras and camera techniques can be altered to achieve this end and perhaps, more important, prove the feasibility of the new zenith cameras and zenith camera systems mentioned herein and including as a minimum, the self-levelling type requiring a single exposure and having a position accuracy of twenty seconds, the reconnaissance type, and the third described type based on levelling through the use of interference fringes and having an exceedingly high degree of accuracy, each type showing the zenith as a single point on a photographic exposure.

A more general purpose of the invention is to improve the accuracy and reduce the time of observation and data reduction of an astronomic position obtained by protogrammetric means. This is demonstrated by the fact that the accuracy of an astronomic position obtained by photogrammetric methods may equal and emulate the accuracy of astronomic position by mechanical-optical surveying methods. Moreover, it is possible to show that the star exposures for position may be reduced to the simplicity of an exposure with an amateur camera where only conventional navigation accuracy is required.

Other objectives and the various features of the invention will appear in the following detailed description of camera systems and techniques.

In the drawings which are for the most part diagrammatic,

FIG. 4 is a diagrammatic sectional view showing a third camera with considerably greater accuracy than the others, this camera being suggested for research and being a refinement of the zenith cameras in FIGS. 2 and 3.

FIG. 5 is an elevational view showing interference fringes as they would be viewed in an eyepiece of an autocollimating telescope in the camera of FIG. 4.

FIG. 6 is a schematic sectional view showing a tilt meter, this being one of the instruments employed to measure the changing configuration of the earth's surface since it will exhibit interference fringes to a monochromatic collimated light source that are viewed through the eyepiece of the autocollimating telescope of the camera of FIG. 4.

Figure 1:
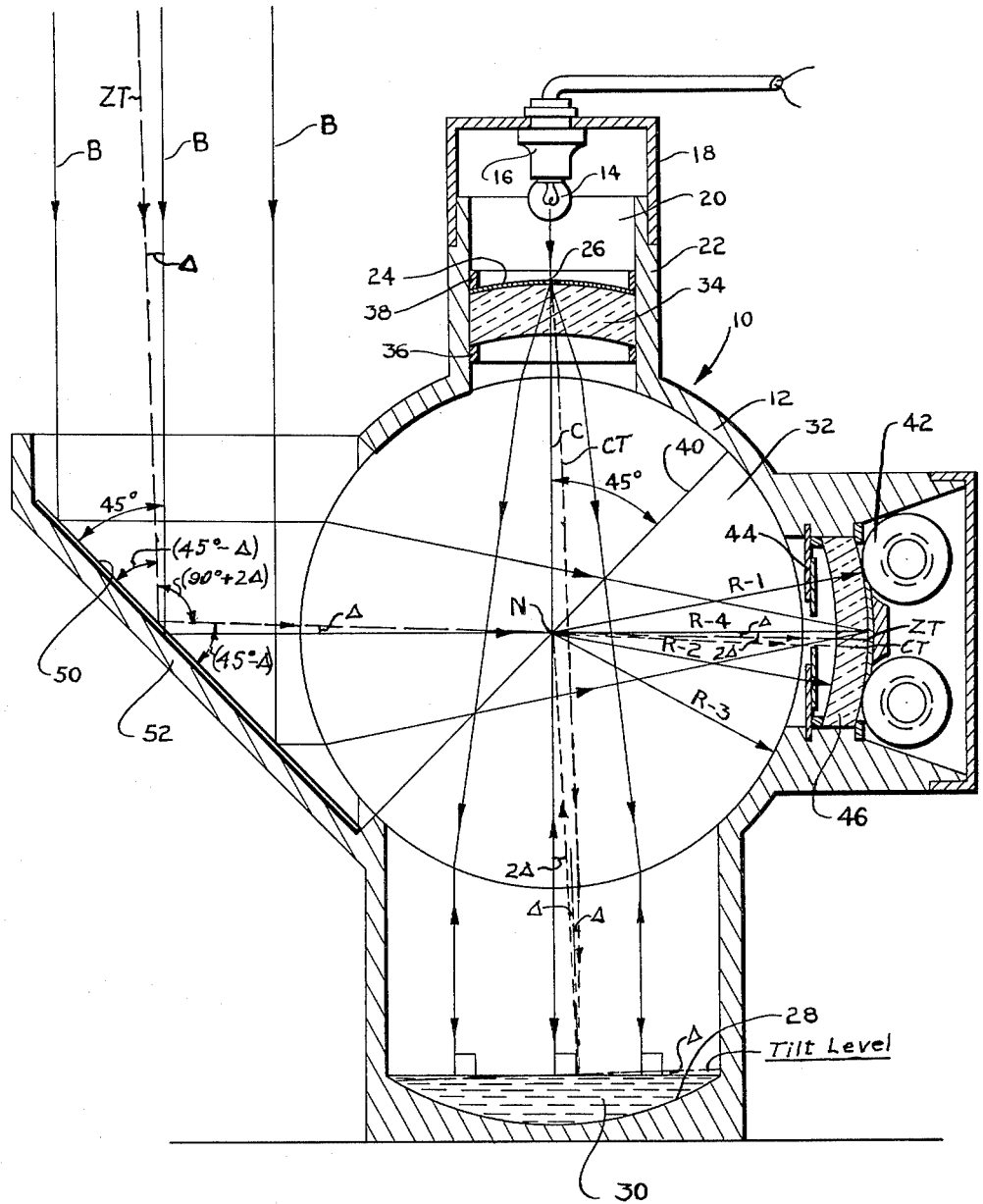
FIG. 1 is a diagrammatic sectional view showing a self-levelling type camera having principal application in connection with aerial reconnaissance.

The self-levelling zenith camera 10 is shown diagrammatically in FIG. 1. This camera is intended for aerial reconnaissance and is an outgrowth logically following the described modification of the Air Force zenith camera and is not suited for and does not have a self-levelling feature. It is considered, however, to be an improvement of the zenith camera disclosed in my pending application S.N. 550,519, filed December 2, 1955, now Patent No. 2,968,228.

Zenith camera 10 has a camera case 12. The configuration can be changed to suit spatial requirements, and as shown, the case 12 is merely a convenience for the support of the component parts housed within or carried by it. Source 14 of illumination consists of an electric lamp in socket 16, and this is attached to cap 18 that partially encloses light compartment 20. The side walls 22 of the light compartment are made of a part of the casing, and one wall of compartment 20 is established by plate 24. Pinhole 26 is in plate 24 through which light from source 14 is passed.

Casing 12 has an upwardly opening recess 28 supporting a pool 30 of mercury or other liquid having a light reflective surface. There is a spherical lens 32 in casing 12 and located between the pinhole 26 and the pool 30 of mercury. Diverging lens 34 is spaced from a part of the surface of lens 32 but superposed therewith. It is held in place by retainer 36 between lens 32 and lens 34 and ring retainer 38 above pinhole plate 24, all contained within side walls 22. Semi-transparent reflector 40 bisects lens 32 at 45° to the axis of light from pinhole 26.

Film transport 42 employing conventional structure, is carried by casing 12, and the same holds true for the conventional shutter 44 located between the film plane behind lens 46 and a surface of spherical lens 32. The film transport is so disposed that the film plane is mechanically held at right angles to the beam of light C passing through pinhole 26.

Rays B emanating from the star field are adapted to impinge on plane mirror 50 that is mechanically held by support 52 of casing 12, at a precise 45° angle with the vertical and at a precise 90° angle with the semi-transparent reflecting surface 40 when the zenith camera is precisely vertical as shown in FIG. 1.

The self-levelling zenith camera of FIG. 1 is concentric for all radii R–1, R–2, R–3, etc. A concentric system has zero coma, astigmatism and distortion. Each system may be corrected for spherical and chromatic aberration. The system has a concentric image surface which is exploited in the interest of simplified data reduction.

The concentric system shown in FIG. 1 has one nodal point N and an infinite number of axes. For this reason the performance is unaffected by tilts and is well adapted for a built-in beam splitter.

The pinhole 26 passes light ray C that defines an angle of 90° with the optical axis at the nodal point N. When the camera is levelled an exposure of stars will provide an image of the zenith as a single spot of light superimposed over the principle point by reflection of ray C from the mercury surface and then the semi-transparent surface 40. The last radius R–4 is made to coincide with the image surface.

Now, if an exposure is made with the camera inclined at an angle delta the pinhole is imaged two delta away from the optical axis and the zenith of the imaged star field is delta away from the optical axis on the same line. This is explained by reference to FIG. 1 with dotted line ZT (zenith tilted position) shown at an angle of tilt Δ. Line ZT is reflected from surface 50 through point N to point ZT on the imaged surface which is the film in FIG. 1. Now, the collimated light from source 26 is at an angle Δ with the normal to the liquid 30 surface but the surface remains in the original position (does not tilt due to its fluidity) and therefore the ray reflected from the surface will be at said angle of 2Δ. Thereafter this ray is reflected from mirror 40 surface at an angle deflected 2Δ from the horizontal axis of the camera. This ray will then be recorded on the image surface at a point displaced twice the distance from the principal point that the zenith ZT is registered. Therefore, the zenith may be recorded, without levelling, on a single exposure of film by halving the angle of deflection. The combining of the concentric system and photographic image of the vertical provides a system whose performance is not reduced by vertical deviation of the pinhole. The provision of a built-in beam splitter, composed of surface 40 in lens 32, leads to compactness not otherwise possible.

Figure 2:
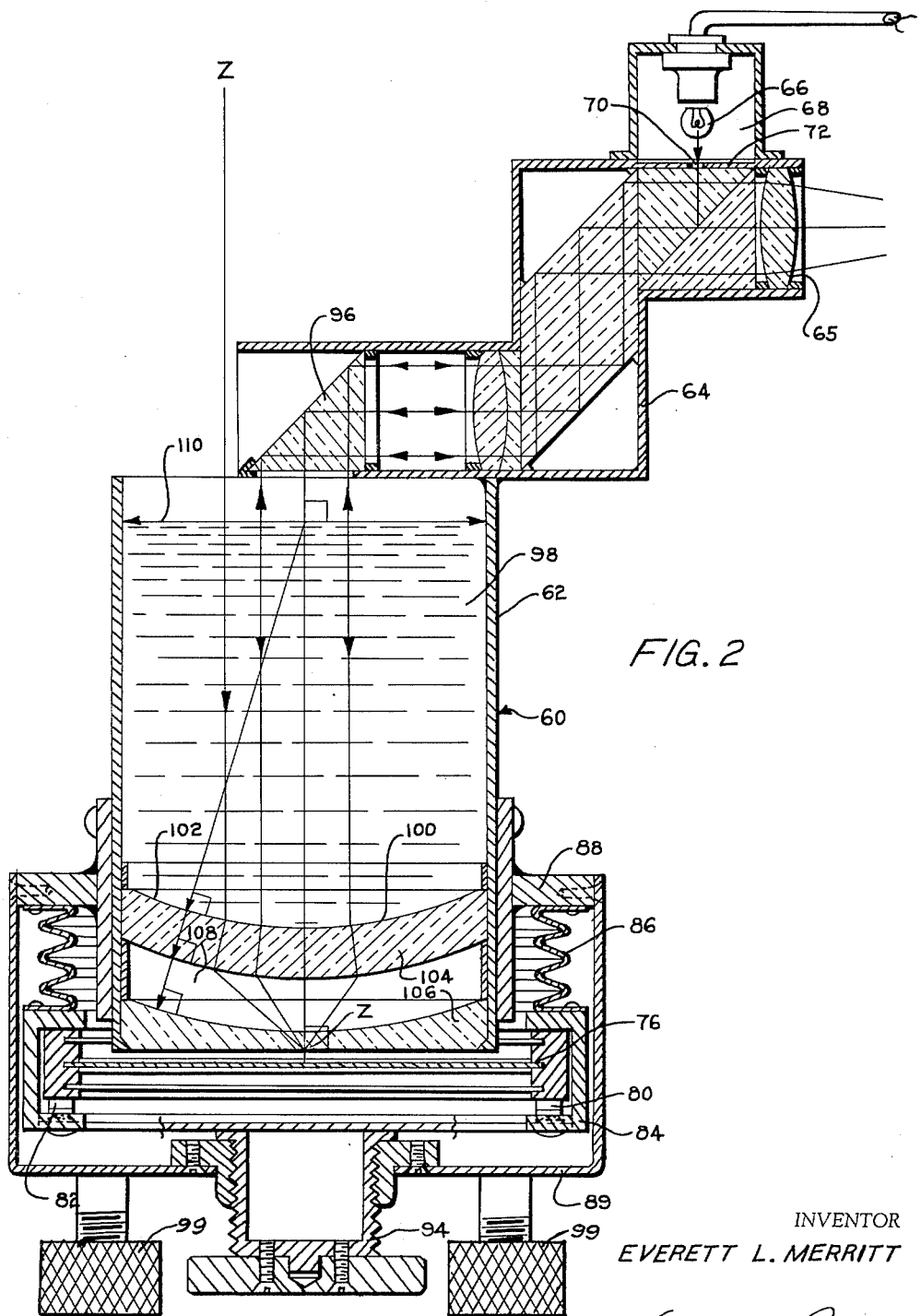
FIG. 2 is a camera based on manual autocollimation and is adapted for principal use in connection with geodetic work.
Figure 3:
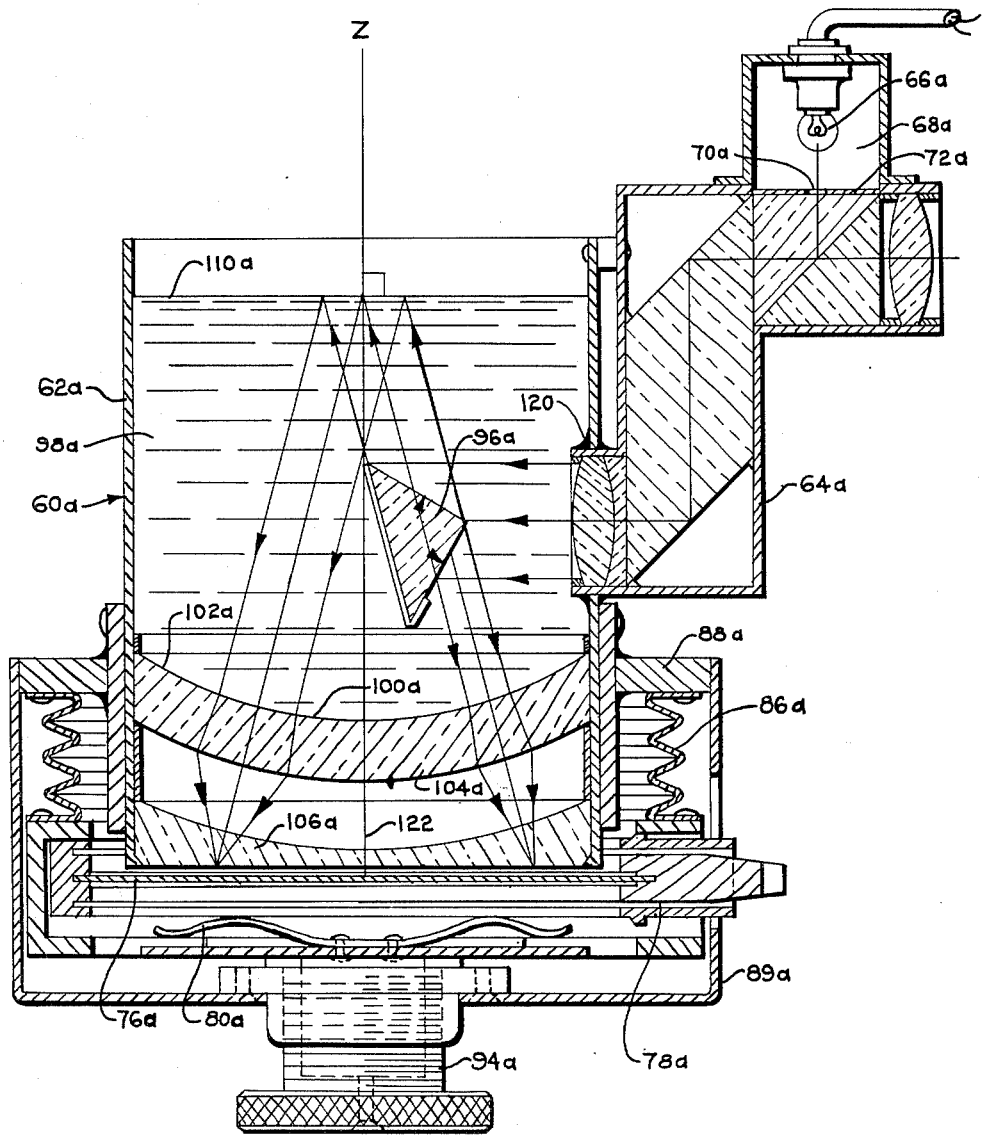
FIG. 3 is a diagrammatic sectional view of a modification of the camera in FIG. 2, the principal difference in construction being the location of the beam splitter within the liquid lens rather than above it as in FIG. 2.

Reference is now made principally to FIGS. 2 and 3. These cameras are not designed for reconnaissance work, even though the principles of the invention, when applied for improvements in reconnaissance, for instance by using the embodiment of the invention in FIG. 1, fulfill an appreciable need in the art. The cameras of FIGS. 2 and 3 are for geodetic work. In FIG. 2 there is a camera 60 with a casing 62 having a conventional autocollimating telescope 64 thereon. The autocollimating telescope has an eyepiece or viewer 65, a source 66 of light shown as an electric lamp in its light chamber 68 and adapted to direct light rays through pinhole 70 in plate 72 that constitutes one wall or chamber 68. The grouping of lenses in the autocollimating telescope 64 is conventional.

The lower part of the casing 62 has a film plate 76 in a plate holder 78, the latter held in place by springs 80 and 82 in the adjustable film plate holder support 84. Support 84 has a side entrance (FIG. 3) for insertion and removal of holder 78, and is in a light-tight enclosure schematically represented by bellows 86. These are secured to a wall 88 of enclosure 90 that is attached to the lower part of the bowl of casing 62. Enclosure 89 has adjusting screw assembly 94 bearing against the bottom wall of support 84.

Prism 96 is the last lens in the series of lenses of autocollimating telescope 64. It is located above a group of three lenses in casing 62 and in alignment with photographic plate 76. This group of three lenses consists of a column of water 98 having a convex lower surface 100 established by the water column resting on the concave upper surface 102 of concavo-convex lens 104. The concavo-convex lens is spaced from the concave lens 106 by air space 108, and concave lens 106 is adjacent to the film plate 76.

Lens 98 is a positive plano-convex element since the upper surface 110 thereof is always planar regardless of camera tilt and the water lens is always concentric with the negative element (lens 104) of glass. In such a system the zenith point Z is the only point without refractive displacement regardless of the tilt of the camera. This is shown by following the rays identified as to direction by the arrows in FIG. 2 and going from the star field and passing through the telescope 65. In use, this camera is first leveled by the leveling screws 99 or the like at the bottom of the camera to bring the image of the light source to register with the cross hairs in the telescope. Then the zenith will fall on the principal point of the film in the camera.

While a built-in autocollimating telescope 64 is shown, the point of no displacement may be solved for analytically on a single exposure without levelling and therefore without the autocollimating telescope. If a lengthy computation is objectionable the water surface 110 may be autocollimated by working foot screws 99 that support the entire casing 62. The image, then, of the collimator center cross recorded with a single star exposure is an image of the zenith.

In FIG. 3 a slight modification of camera 60 is identified as camera 60a. Accordingly, all of the parts of the camera 60a are designated the same as the parts of camera 60 with the distinguishing letter "a" thereafter. By comparison of these figures it will be seen that there are no essentially different parts nor are there additional parts of significance. The collimated light source 66a is in telescope 64a, but the telescope is attached in an opening 120 in the side wall of casing 62a below the surface 110a of liquid lens 98a. The beam splitter prism 96a is submerged beneath surface 110 instead of being above that surface as shown in FIG. 2. The difference is that the collimated light source is incident on a 90° prism 96a mounted within the water lens and the prism is inclined so that the beam is split in opposite directions as shown by the rays with arrow heads thereon in FIG. 3. One part reaches the photographic plate 76a directly while the other part reaches the photographic plate after reflection from the surface 110a. The bisector 122 of the angle defined by the two images is the normal to the water surface and hence the zenith Z. Thus again the zenith point is recoverable without levelling on a single exposure, and will be determined as a point midway between the light spot on the photographic plate.

Camera 130 (FIGS. 4-6) is a refinement of the geodetic cameras and by comparison of FIGS. 2 and 4, it will be seen that the structure involved is almost identical. However, camera 130 is to be used with auxiliary instruments in order to measure the changing configuration of the earth's surface. One of these instruments is tilt meter 132 (FIG. 6). Tilt meter 132 is constructed of an autocollimating telescope 134 with a monochromatic light source 136. A plano-parallel glass lens 138 is at the optical outlet end of the tilt meter beneath which there is an air space 140, for one configuration of tilt meter, the space being three millimeters in thickness. The three millimeter air space between the surface 142 of oil 144 in vessel 146 that is in optical alignment with the telescope 134, will take a wedge-shape when the tilt meter is tilted, and this will exhibit interference fringes (FIG. 5) to a monochromatic collimated light source. The fringes are viewed through the eyepiece of the collimating telescope that has north-south and east-west lines visible therein.

If the earth's surface did not bend or deform to the weight of accumulated water after rain, the sun passing over, the changing temperature, the tides, the interference pattern would remain fixed. However, the earth is changing shape because of the effect of the various physical phenomena mentioned above. These changes are minute but none-the-less detectable in the changing pattern of fringes. The upper surface of the plate, having the north-south and east-west axes etched thereon provide a reference so that the components of tilt may be read directly and directionally and any change in the pattern corresponds to a change in tilt.

This instrument is undoubtedly one of the most sensitive indicators of the earth's changing configuration, being sensitive to approximately two-tenths of a second. Assume now that the simplified tilt meter is mounted above the aperture 149 shown in FIG. 4. The telescope 64b functions as a tilt meter with the space 151 responding in construction and function to space 140 (FIG. 6). The fringes are removed or duplicated in the direct and reverse position by working foot screws 99b on camera 130 so that by adjustment of the camera in this way, movements of the camera are manually introduced. The tilt angles of the optical axis of the camera 130 will be equal for the direct and reverse positions (i.e. for a first levelling in one position and for a second levelling at a 180° removed position) within the accuracy of the tilt meter, namely two-tenths arc seconds for the tilt meter 132.

Camera 130 has its telescope 64b mounted above the liquid lens 98b, and all other structure in this camera is the same as camera 60, with the exception of the inclusion of one additional plano-parallel lens 150 in aperture 149 between the beam splitter prism 96b and the surface 110b of the liquid lens (water) 98b. Accordingly, numerical designation with the identifying letter is followed in FIG. 4.

The first image is taken of the star field with a level adjustment of the instrument which is observed to give a definite number of fringes in the telescope. The position of the camera is reversed and the camera re-leveled to give the same number of fringes as before. A second image of the star field is taken. By superposing these two images the zenith point may be determined at the mid-point between the two principal points on the two images.

Many modifications of this invention may be made without departing from the spirit and scope of the appended claims.

What is claimed is:

1. In a camera that has a casing, a liquid lens having a self-levelling planar surface on top, a solid lens having concave and convex spherical concentric surfaces respectively opposite said planar surface and centered on a point in said planar surface, a photographic plate in alignment in the focal plane below said lenses, a collimating telescope connected with said casing and having a light source adapted to project its collimated rays to said planar surface, a beam splitter in alignment with the parallel light rays from said telescope and mounted within said liquid lens with the split portions of said parallel rays going respectively upwardly to the center of said planar surface and reflected therefrom for focussing on said photographic plate, and from said splitter downwardly in the opposite direction to focus on said photographic plate with the bisector of the angle made by said split portions being perpendicular to the liquid surface and hence being aligned with the zenith.

2. A self-levelling zenith camera comprising a camera casing having a light chamber within which to support a source of light, a pinhole in said chamber, a spherical lens in said casing with its vertical axis in alignment with the light issuing downwardly from said pinhole, said lens having a semi-mirror surface, a liquid in said casing and having a planar self-levelling reflecting surface below said spherical lens, a film, means supporting said film in said casing, said film having a light-sensitive surface in the focal plane of said lens back of said lens, said semi-mirror surface dividing said spherical lens in a plane normal to the vertical axial plane but inclined 45° from the vertical toward the focal plane of said lens, a light reflector carried by said casing at a 45° angle with respect to the horizontal optical axis established by said reflector and said spherical lens whereby when the camera is used an exposure of stars will provide an image of the zenith field about the optical axis by reflection from said reflecting surface, and an exposure of the pinhole light made with the camera tilted from the zenith is imaged at a fixed angle away from the optical axis and the zenith of the imaged star field is another fixed angle away from the optical axis on the same line.

3. An optical instrument comprising a casing, a spherical lens mounted therein and having a median semi-silvered surface at a 45° angle to the lateral axial plane of the instrument and perpendicular to the vertical axial plane thereof, said casing having an aperture to admit rays to the front of the lens, said lens having an image surface centered on the optical axis at the rear side of the lens at the focus of parallel rays entering the front of the lens, the bottom of said casing having a dished portion spaced from the bottom of the lens, a quantity of liquid in said dished portion to provide a level reflecting surface, a point source of light at the top of the lens, whereby the rays from said point source which pass through said spherical lens and are directed to said level reflecting surface in a direction parallel to the vertical axis of the instrument, will be reflected thereby back through said spherical lens and by said semi-silvered surface to the image surface at a deflected level on the image surface opposite to and twice as much as that of the image of any parallel horizontal rays entering said aperture regardless of any slight tilt of the optical axis of said instrument from horizontal.

4. An instrument as defined in claim 3, having an opening at the image surface, a film holding and feeding assembly mounted in said opening over the image surface, and a 45° mirror mounted on said casing in front of said aperture for use as a zenith recording camera to take exposures of the zenith field and recording the zenith position thereon.

5. A zenith camera comprising a housing, a concentric spherical lens system having an image surface at the focal plane of parallel rays entering said lens system from the zenith field, all spherical lens surfaces in said system having a common center, a self-levelling liquid reflecting surface in said housing, a point source of light in said camera having collimator means for projecting parallel rays originating at said point source, along the axis of said spherical lens system, for reflection by said liquid reflecting surface and on focussing to indicate on said image surface the displacement of said vertical axis from the true zenith.

6. A zenith camera as defined in claim 5, wherein said collimator means comprises a portion of said spherical lens system, said liquid surface being located below said system and the point source of light being on the vertical axis at the top of said system to project its collimated parallel rays downwardly to said liquid surface, the horizontal axis of said system being its optical axis and having the aperture at one end of the system, the image surface at the opposite end, and a 45° mirror at the aperture end for reflecting the parallel rays from the zenith field horizontally into said aperture, said system having a 45° semi-mirror surface at the intersection of the vertical and horizontal axes of said system to reflect said reflected rays from said liquid surface for focussing the point source of light on said image surface to facilitate orientation of the zenith point on said image surface.

7. A zenith camera as defined in claim 5, said camera having an aperture at its top, said lens system including a liquid lens providing said reflecting surface in said aperture, said collimator means comprising a telescope extending to one side of said housing for directing said parallel light rays horizontally into said liquid lens, a beam splitter in said liquid lens for reflecting a portion of said parallel light rays upwardly at an angle to the liquid surface at the optical axis of said lens, for reflection downwardly therefrom for focussing on the focal plane of said lens system, the remaining portion of said parallel light rays being reflected in the opposite direction by said beam splitter and focussed on said focal plane for orienting the position of the zenith point on the image of the zenith field half way between the focussed light rays from said point light source.

8. In a zenith camera, a casing, a pinhole source of light directed into said casing, a spherical lens system having a vertical axis and an image surface, and adapted for receiving parallel rays from the zenith field and focusing them on said image surface, all spherical lens surfaces in said system having a common center, and a self-levelling liquid surface centered substantially at the point of concentricity of all the spherical surfaces of said lens system, for reflecting collimated parallel rays from said pinhole source of light projected into said lens system and refocused on said image surface to indicate the displacement of the zenith point from the principal point on said image.

References Cited in the file of this patent

UNITED STATES PATENTS

| 2,384,666 | Wood | Sept. 11, 1945 |
| 2,862,428 | Salter | Dec. 2, 1958 |